(12) United States Patent
Moon et al.

(10) Patent No.: US 11,611,703 B2
(45) Date of Patent: Mar. 21, 2023

(54) CAMERA MODULE, METHOD OF CORRECTING MOVEMENT OF THE MODULE, IMAGE STABILIZATION DEVICE THEREFOR

(71) Applicant: LG INNOTEK CO., LTD., Seoul (KR)

(72) Inventors: Young Seop Moon, Seoul (KR); Young Woon Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 749 days.

(21) Appl. No.: 16/476,374

(22) PCT Filed: Jan. 9, 2018

(86) PCT No.: PCT/KR2018/000399
§ 371 (c)(1),
(2) Date: Jul. 8, 2019

(87) PCT Pub. No.: WO2018/128518
PCT Pub. Date: Jul. 12, 2018

(65) Prior Publication Data
US 2022/0006956 A1 Jan. 6, 2022

(30) Foreign Application Priority Data
Jan. 9, 2017 (KR) .................. 10-2017-0002853

(51) Int. Cl.
*H04N 5/232* (2006.01)
*G02B 27/64* (2006.01)
*G02B 3/12* (2006.01)

(52) U.S. Cl.
CPC ....... *H04N 5/23258* (2013.01); *G02B 27/646* (2013.01); *H04N 5/2328* (2013.01); *G02B 3/12* (2013.01)

(58) Field of Classification Search
CPC ............. H04N 5/23258; H04N 5/2328; G02B 27/646; G02B 3/12
See application file for complete search history.

(56) References Cited

U.S. PATENT DOCUMENTS

| 8,749,648 B1 | 6/2014 | Kohn et al. |
| 9,232,138 B1 | 1/2016 | Baldwin |

(Continued)

FOREIGN PATENT DOCUMENTS

| CN | 103167237 A | 6/2013 |
| CN | 103533230 A | 1/2014 |

(Continued)

OTHER PUBLICATIONS

International Search Report (PCT/ISA/210) issued in PCT/KR2018/000399, dated Apr. 19, 2018.

*Primary Examiner* — Luong T Nguyen
(74) *Attorney, Agent, or Firm* — Birch, Stewart, Kolasch & Birch, LLP (57) ABSTRACT

The present invention provides a camera module includes a lens assembly including a plurality of lenses; an image sensor for converting an optical signal transferred through the lens assembly into an electric signal; a gyro sensor for outputting a variation signal in response to movement of the lens assembly and the image sensor; a stabilization controller for determining, in response to the variation signal, a first compensation value used to perform optical image stabilization (OIS) by driving at least one of the lenses and determining a second compensation value used to perform electronic image stabilization (EIS) by adjusting an effective area of the image sensor; and a movement correction device outputting a first control signal and a second control signal to perform image stabilization in response to the first compensation value and the second compensation value.

8 Claims, 4 Drawing Sheets

(56) References Cited

U.S. PATENT DOCUMENTS

| | | | | |
|---|---|---|---|---|
| 9,743,001 B1* | 8/2017 | Stec | ................... | H04N 5/23287 |
| 2010/0295987 A1* | 11/2010 | Berge | ................... | G02B 26/005 |
| | | | | 348/360 |
| 2013/0155262 A1 | 6/2013 | Katoh et al. | | |
| 2014/0002679 A1 | 1/2014 | Ikeda | | |
| 2015/0331156 A1 | 11/2015 | Hirsa | | |
| 2016/0360111 A1* | 12/2016 | Thivent | .............. | H04N 5/23267 |
| 2017/0331998 A1* | 11/2017 | Yu | ........................ | H04N 5/2327 |

FOREIGN PATENT DOCUMENTS

| | | | |
|---|---|---|---|
| CN | 104349061 A | | 2/2015 |
| KR | 10-2015-0085043 A | | 7/2015 |
| KR | 10-2016-0006492 A | | 1/2016 |
| KR | 10-1657283 | * | 9/2016 |
| KR | 10-1657283 B1 | | 9/2016 |

* cited by examiner

CAMERA MODULE, METHOD OF CORRECTING MOVEMENT OF THE MODULE, IMAGE STABILIZATION DEVICE THEREFOR

CROSS REFERENCE TO RELATED APPLICATIONS

This application is the National Phase of PCT International Application No. PCT/KR2018/000399, filed on Jan. 9, 2018, which claims priority under 35 U.S.C. 119(a) to Patent Application No. 10-2017-0002853, filed in the Republic of Korea on Jan. 9, 2017, all of which are hereby expressly incorporated by reference into the present application.

TECHNICAL FIELD

The present disclosure relates to a camera module. More particularly, the present disclosure relates to a camera module including a lens enabling adjustment of a focal length using electrical energy.

BACKGROUND ART

A camera module is a module of a camera that captures a still picture or a video of a subject. As an example of the camera module, an AF camera module has an auto-focusing (AF) function, which is a function of automatically adjusting a focus in accordance with the distance to a subject.

The auto-focusing is performed by moving a lens module including a plurality of lenses in an optical-axis direction using a lens moving apparatus.

An OIS camera module performs a handshake compensation (or optical image stabilization (OIS)) function by moving a lens module including a plurality of lenses in a direction perpendicular to an optical axis using a lens moving apparatus.

However, the lens moving apparatus consumes a large amount of power, requires additional components for driving, such as various support members, magnets, and coils, and further requires a cover glass, which is provided separately from a camera module in order to protect the above components, thus leading to an increase in the overall thickness of the lens moving apparatus. Therefore, research has been conducted on a liquid lens configured to electrically adjust the curvature of an interface between two kinds of liquid in order to perform auto-focusing and handshake compensation functions.

DISCLOSURE

Technical Problem

The present disclosure provides an apparatus and a method capable of using optical image stabilization (OIS) and electronic image stabilization (EIS) simultaneously in order to correct the movement of a camera module, thereby further increasing the range within which it is possible to correct the movement of the camera module.

In addition, the present disclosure provides a camera module capable of performing electronic image stabilization (EIS) or optical image stabilization (OIS) in response to the output of a gyro sensor in order to compensate for various and complicated movements of a camera module, which includes a lens that enables adjustment of a focal length thereof using electrical energy and is capable of compensating for movement exceeding a compensation range by performing complementary operation and additional image stabilization (IS).

In addition, the present disclosure provides a camera module to which different types of image stabilization (IS) technologies are applicable together in order to correct the movement of the camera module, thereby making it possible to more precisely and quickly control the compensation of the movement of the camera module and to improve the performance of the camera module.

However, the objects to be accomplished by the disclosure are not limited to the above-mentioned objects, and other objects not mentioned will be clearly understood by those skilled in the art from the following description.

Technical Solution

In one embodiment, a camera module may include a lens assembly including a plurality of lenses, an image sensor converting an optical signal transmitted through the lens assembly into an electrical signal, a gyro sensor outputting a variation signal in response to movement of the lens assembly and the image sensor, a stabilization controller determining a first compensation value used to perform optical image stabilization (OIS) by driving at least one of the lenses and determining a second compensation value used to perform electronic image stabilization (EIS) by adjusting an effective area of the image sensor in response to the variation signal, and a movement correction device outputting a first control signal and a second control signal to perform image stabilization in response to the first compensation value and the second compensation value.

In addition, the movement correction device may include an optical image stabilization unit outputting a first control signal to drive at least one of the lenses in response to the first compensation value, and an electronic image stabilization unit outputting a second control signal to adjust the image sensor in response to the second compensation value.

In addition, the stabilization controller may determine the first compensation value by subtracting a second compensation value to perform the electronic image stabilization unit from the variation signal.

In addition, when the variation signal is less than a maximum value of the second compensation value to perform the electronic image stabilization unit, the stabilization controller may determines that there is no the first compensation value.

In addition, the stabilization controller may determine the second compensation value by subtracting a maximum value of the first compensation value to perform the optical image stabilization unit from the variation signal.

In addition, when the variation signal is less than a maximum value of the first compensation value to perform the optical image stabilization unit, the stabilization controller may determines that there is no the second compensation value.

In addition, the stabilization controller may determine the first compensation value and the second compensation value by dividing the variation signal at a predetermined ratio.

In addition, the optical image stabilization unit may perform optical image stabilization (OIS) by outputting the first control signal to move at least one lens in an optical-axis direction or in a direction perpendicular to an optical axis, and the electronic image stabilization unit may output the second control signal to adjust an effective area of the image sensor that converts an optical signal into an electrical signal.

In addition, the lens assembly may include at least one liquid lens, the liquid lens may include a conductive liquid and a non-conductive liquid, and the conductive liquid and the non-conductive liquid may form an interface therebetween. The liquid lens may include a first plate including a cavity formed therein to accommodate the conductive liquid and the non-conductive liquid, a first electrode disposed on the first plate, a second electrode disposed under the first plate, and a second plate disposed on the first plate. In addition, the liquid lens may further include a third plate disposed under the first plate, and each of the first electrode and the second electrode may include one or more electrode sectors. The optical image stabilization unit may perform optical image stabilization (OIS) by outputting the first control signal to adjust the interface of the liquid lens, and the electronic image stabilization unit may output the second control signal to adjust an effective area of the image sensor that converts an optical signal into an electrical signal.

In another embodiment, an optical device may include a display unit configured to output an image, a camera module configured to capture an image, and a body housing in which the display unit and the camera module are mounted. The camera module may include a lens assembly including a plurality of lenses, an image sensor converting an optical signal transmitted through the lens assembly into an electrical signal, a gyro sensor outputting a variation signal in response to movement of the lens assembly and the image sensor, a stabilization controller determining a first compensation value used to perform optical image stabilization (OIS) by driving at least one of the lenses and determining a second compensation value used to perform electronic image stabilization (EIS) by adjusting an effective area of the image sensor in response to the variation signal, and a movement correction device outputting a first control signal and a second control signal to perform image stabilization in response to the first compensation value and the second compensation value.

In still another embodiment, an image stabilization device may include a receiving unit receiving an input signal including movement variation, a differential unit subtracting a value to be compensated for from the input signal, a transmitting unit transmitting an output of the differential unit, and a stabilization unit performing image stabilization in response to the value to be compensated for.

In addition, the image stabilization may include optical image stabilization (OIS) for adjusting a camera lens.

In addition, the image stabilization may include electronic image stabilization (OIS) for adjusting an image sensor.

In addition, the image stabilization device may further include a determination unit determining the value to be compensated for by comparing the input signal with the maximum compensation value of the stabilization unit.

In still another embodiment, a movement correction device may include a gyro sensor sensing movement and outputting variation, a first stabilization unit connected to the gyro sensor and performing first image stabilization in response to a first compensation value calculated from the variation, and a second stabilization unit connected to the first stabilization unit and performing second image stabilization in response to a second compensation value calculated by subtracting the first compensation value from the variation.

In addition, the first image stabilization may include electronic image stabilization (OIS), and the second image stabilization may include optical image stabilization (OIS).

In addition, the first image stabilization may include optical image stabilization (OIS), and the second image stabilization may include electronic image stabilization (OIS).

In addition, the first stabilization unit may include a receiving unit receiving an input signal including the variation, a differential unit determining the second compensation value by subtracting the first compensation value from the input signal, a transmitting unit outputting the second compensation value, and a stabilization unit performing the first image stabilization in response to the first compensation value.

In addition, the first stabilization unit may further include a determination unit determining the first compensation value by comparing the input signal with the maximum compensation value of the stabilization unit.

In still another embodiment, a method of correcting movement of a camera may include sensing movement of the camera and outputting variation, performing first image stabilization in response to a first compensation value calculated from the variation, and performing second image stabilization in response to a second compensation value calculated by subtracting the first compensation value from the variation.

In addition, the first image stabilization may include electronic image stabilization (EIS), and the second image stabilization may include optical image stabilization (OIS).

In addition, the first image stabilization may include optical image stabilization (OIS), and the second image stabilization may include electronic image stabilization (EIS).

In addition, the performing the first image stabilization in response to the first compensation value calculated from the variation may include receiving an input signal including the variation, determining the second compensation value by subtracting the first compensation value from the input signal, outputting the second compensation value, and performing the first image stabilization in response to the first compensation value.

In addition, the performing the first image stabilization in response to the first compensation value calculated from the variation may further include determining the first compensation value by comparing the input signal with the maximum compensation value of the stabilization unit which performs image stabilization including the optical image stabilization (OIS) and the electronic image stabilization (EIS).

In still another embodiment, a computer-readable recording medium having recorded thereon a program for executing a method of correcting movement of a camera may perform operations provided in the method of correcting movement of a camera.

In still another embodiment, a movement correction device may include a processing system, and the processing system may include at least one processor and at least one memory device in which a computer program is stored. The processing system may enable the movement correction device to perform a step of receiving an input signal including movement variation, a step of determining a remaining value by subtracting a value to be compensated for from the input signal, and a step of individually transmitting the value to be compensated for and the remaining value.

In addition, the processing system may enable the movement correction device to further perform a step of performing electronic image stabilization (EIS) based on the value to be compensated for, and a step of performing optical image stabilization (OIS) based on the remaining value.

In addition, the processing system may enable the movement correction device to further perform a step of performing optical image stabilization (OIS) based on the value to be compensated for, and a step of performing electronic image stabilization (EIS) based on the remaining value.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of the device according to the present disclosure will be described below.

The present disclosure may use all of the advantages of optical image stabilization (OIS) and electronic image stabilization (EIS) in order to correct the movement of a camera module due to external vibration such as hand tremors.

In addition, the present disclosure may increase a range within which it is possible to correct the movement of the camera module by correcting the movement of the camera module using both optical image stabilization (OIS) and electronic image stabilization (EIS).

However, the effects achievable through the disclosure are not limited to the above-mentioned effects, and other effects not mentioned will be clearly understood by those skilled in the art from the following description.

BEST MODE

Reference will now be made in detail to the preferred embodiments, examples of which are illustrated in the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

Figure 1:
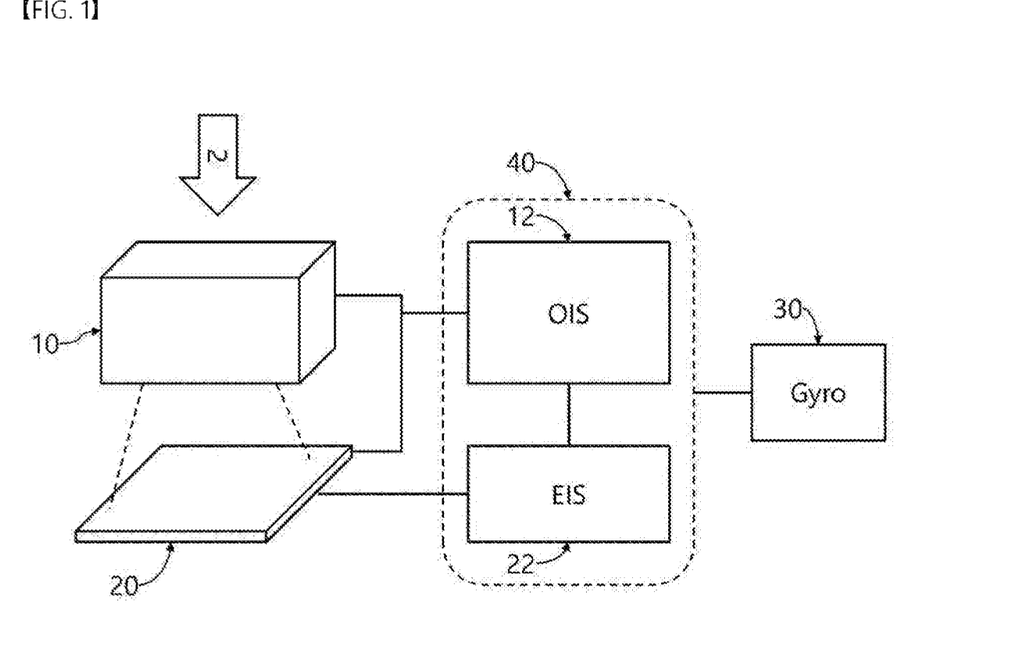
FIG. 1 shows a camera module enabling movement correction.

FIG. 1 shows a camera module enabling movement correction.

As illustrated, the camera module may include a lens assembly 10 and an image sensor 20. The camera module may further include a gyro sensor 30 or a movement correction device 40. The movement correction device 40 may also be referred to as a movement correction unit, and the movement correction device 40 and the movement correction unit may be used interchangeably in this specification. Further, the camera module may include a movement correction device 40 for adjusting the lens assembly 10 and the image sensor 20 in response to variation transmitted from the gyro sensor 30.

More specifically, the movement correction device 40 may include an optical image stabilization (OIS) unit 12 and an electronic image stabilization (EIS) unit 22. The optical image stabilization (OIS) unit 12 may output a first control signal for adjusting the lens assembly 10 in response to variation transmitted from the gyro sensor 30, and the electronic image stabilization (EIS) unit 22 may output a second control signal for adjusting the image sensor 20 in response to variation transmitted from the gyro sensor 30. The movement correction device 40 may use both the optical image stabilization (OIS) unit 12 and the electronic image stabilization (EIS) unit 22, which are of different types, in response to variation transmitted from the gyro sensor 30. For example, the compensation may be realized such that a portion of the variation is transmitted from the gyro sensor 30 to the optical image stabilization (OIS) unit 12 and the remaining portion of the variation is transmitted from the gyro sensor 30 to the electronic image stabilization (EIS) unit 22.

In order to prevent deterioration in the quality of the camera due to the movement of the camera module attributable to external vibration such as hand tremors, the camera module needs to be fixed so as not to move. However, the fixing of the camera module in a portable device may degrade portability and user convenience. Further, when the camera module mounted in a portable device is used to photograph a moving object, it is very inconvenient to fix the camera module, and the fixing of the camera module makes it difficult to obtain a desired picture or image. Therefore, a device for performing image stabilization (IS) may be included in the camera in order to correct the movement of the camera module or to compensate for variation in the movement thereof.

There are three methods of correcting or compensating for deterioration in the quality of an image due to the movement of a camera: optical image stabilization (OIS), electronic image stabilization (EIS), and digital image stabilization (DIS). Here, optical image stabilization (OIS) serves to stabilize an image through a method of detecting movement and shaking using the gyro sensor 30 and physically moving the lens assembly 10 to change the path of an optical signal. Electronic image stabilization (EIS) serves to stabilize an image through a method of detecting movement and shaking through the gyro sensor 30 and adjusting the region of the image sensor 20 that converts an optical signal into an electrical signal. Finally, digital image stabilization (DIS) serves to stabilize an image output from the image sensor 20 through a software approach, rather than optical image stabilization (OIS) and electronic image stabilization (EIS) using a gyro sensor.

In general, with regard to the above three image stabilization (IS) methods, the image stabilization may be realized at a lower cost in the order of digital image stabilization (DIS), electronic image stabilization (EIS), and optical image stabilization (OIS), and the effects and performance of compensating for or correcting the movement of a camera module may be accomplished more efficiently in the order of optical image stabilization (OIS), electronic image stabilization (EIS), and digital image stabilization (DIS). Here, digital image stabilization (DIS) does not correct or compensate for the movement of a camera module in the process of converting an optical signal into an electrical signal to obtain an image, but corrects or compensates for the movement of a camera module during the processing of an image after conversion into an electrical signal is completed, whereby the quality of an image may be greatly deteriorated.

Meanwhile, the electronic image stabilization (EIS) unit 22 has a limited range within which the movement of the camera module is capable of being corrected or compensated for. This is a problem related to the size of the image sensor 20 included in the camera module and the number of pixels thereof. In particular, in the case of a camera module mounted in a portable device, the physical size of the image sensor 20 is limited. Therefore, in some cases, the electronic image stabilization (EIS) unit 22 may not completely correct or compensate for variation corresponding to the movement of the camera module, which is transmitted from the gyro sensor 30. For this reason, it may be advantageous to correct or compensate for variation corresponding to the movement of the camera module, which is transmitted from the gyro sensor 30, using both the optical image stabilization (OIS) unit 12 and the electronic image stabilization (EIS) unit 22.

The movement correction device 40 may further include a stabilization controller (not shown), which determines a first compensation value for performing optical image stabilization (OIS) and a second compensation value for performing electronic image stabilization (EIS) in response to a variation signal, in order to use both the optical image stabilization (OIS) unit 12 and the electronic image stabilization (EIS) unit 22, which are of different types.

Figure 2:
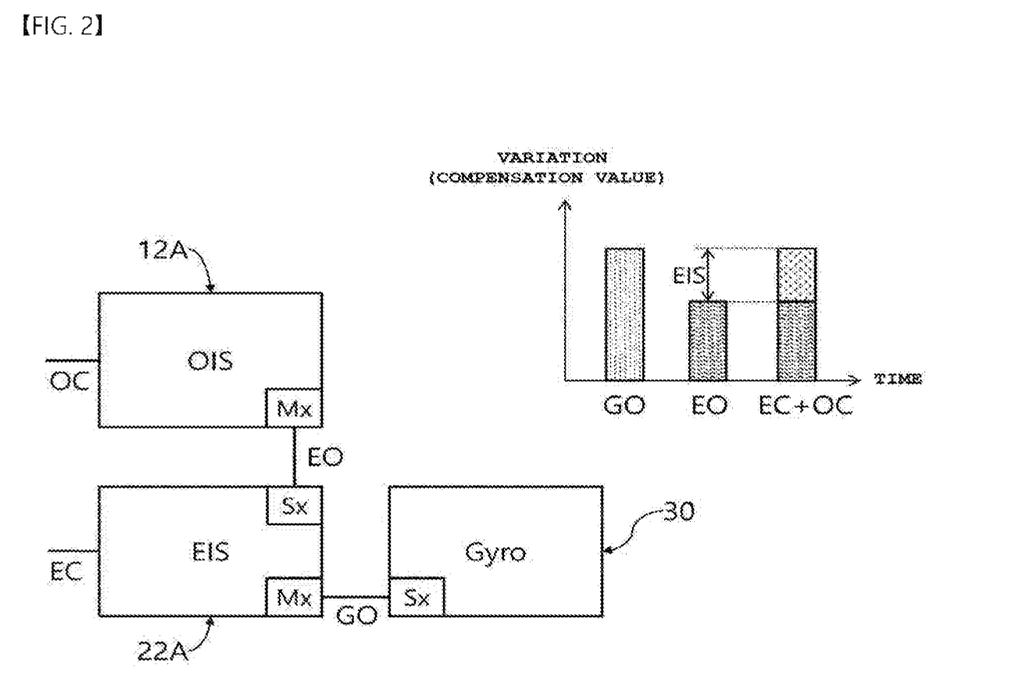
FIG. 2 shows a first example of a movement correction device.

FIG. 2 shows a first example of the movement correction device.

As illustrated, the movement correction device may include an electronic image stabilization unit 22A and an optical image stabilization unit 12A. The electronic image stabilization unit 22A may receive a variation signal GO transmitted from the gyro sensor 30 to perform electronic image stabilization (EIS), and the optical image stabilization unit 12A may receive an output signal EO, which includes a first compensation value for performing optical image stabilization (OIS), from the electronic image stabilization unit 22A to perform optical image stabilization (OIS). Thus, the signal input to the electronic image stabilization unit 22A and the signal input to the optical image stabilization (OIS) unit may be different from each other. The signal input to the electronic image stabilization unit 22A may be a variation signal GO, and the signal input to the optical image stabilization (OIS) unit may be a first compensation value. The variation signal GO and the first compensation value signal may be different signals. Variation transmitted from the gyro sensor 30, i.e. the amount of movement to be corrected or compensated for, may be corrected through the electronic image stabilization unit 22A, and may also be corrected through the optical image stabilization unit 12A. Here, the sum of the second compensation value, which is corrected through the electronic image stabilization unit 22A, and the first compensation value, which is corrected through the optical image stabilization unit 12A, may be substantially the same as the variation transmitted from the gyro sensor 30.

The electronic image stabilization unit 22A may output a second control signal EC for adjusting the image sensor 20 (refer to FIG. 1) in response to the second compensation value. The optical image stabilization unit 12A may physically move the lens assembly 10 (refer to FIG. 1) and the image sensor 20 in response to the first compensation value to output a first control signal OC for adjusting the path of an optical signal. Referring to the graph, variation included in the variation signal GO output from the gyro sensor 30 may be substantially the same as the sum of a compensation value included in the second control signal EC, which is output from the electronic image stabilization unit 22A, and a compensation value included in the first control signal OC, which is output from the optical image stabilization unit 12A. For example, the electronic image stabilization unit 22A may perform image stabilization in response to the second compensation value for performing electronic image stabilization (EIS), and may transmit a value, obtained by subtracting the second compensation value from the variation transmitted from the gyro sensor 30, to the optical image stabilization unit 12A.

For convenience of description, the graph shows the magnitudes of the values that are output from, corrected, or compensated for by the gyro sensor 30, the electronic image stabilization unit 22A, and the optical image stabilization unit 12A. Here, the amount or the value may be acceleration (variation in the speed) of each element in the Cartesian coordinate system (X, Y, Z).

The gyro sensor 30, the electronic image stabilization unit 22A, and the optical image stabilization unit 12A may be connected for serial communication. For example, the gyro sensor 30, the electronic image stabilization unit 22A, and the optical image stabilization unit 12A may be connected in an inter-integrated circuit (I2C) communication manner or a two-wire interface (TWI) manner. The I2C communication is a protocol that supports nearfield communication (N:N communication) between a plurality of slave devices and a plurality of master devices. However, the gyro sensor 30, the electronic image stabilization unit 22A, and the optical image stabilization unit 12A may be connected in series to realize 1:1 communication. If the gyro sensor 30 is not connected to the electronic image stabilization unit 22A and the optical image stabilization unit 12A for 1:1 communication but is connected thereto for 1:2 communication, it is difficult to determine whether the variation signal GO output from the gyro sensor 30 is transmitted to which one of the electronic image stabilization unit 22A and the optical image stabilization unit 12A, and it is also difficult to transmit the first compensation value between the electronic image stabilization unit 22A and the optical image stabilization unit 12A.

Referring to FIG. 2, the gyro sensor 30 and the electronic image stabilization unit 22A may be connected for 1:1 communication. Here, the gyro sensor 30 may be a slave device Sx, and the electronic image stabilization unit 22A may be a master device Mx. Further, the electronic image stabilization unit 22A and the optical image stabilization unit 12A may be connected for 1:1 communication. Here, the electronic image stabilization unit 22A may be a slave device Sx, and the optical image stabilization unit 12A may be a master device Mx.

Figure 3:
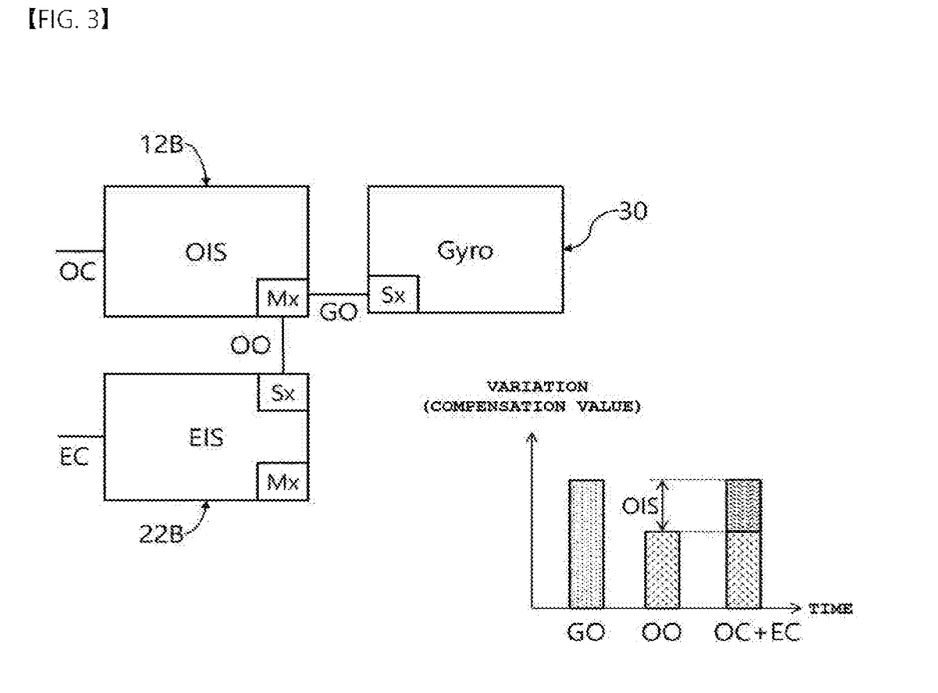
FIG. 3 shows a second example of the movement correction device.

FIG. 3 shows a second example of the movement correction device.

As illustrated, the movement correction device may include an optical image stabilization unit 12B, which receives a variation signal GO transmitted from the gyro sensor 30 to perform optical image stabilization (OIS), and an electronic image stabilization unit 22B, which receives an output signal OO, which includes a second compensation value for performing electronic image stabilization (EIS), from the optical image stabilization unit 12B to perform electronic image stabilization (EIS). Variation transmitted from the gyro sensor 30, i.e. the amount of movement to be corrected or compensated for, may be corrected through the optical image stabilization unit 12B, and may also be corrected through the electronic image stabilization unit 22B. Here, the sum of the first compensation value, which is corrected through the optical image stabilization unit 12B, and the second compensation value, which is corrected through the electronic image stabilization unit 22B, may be substantially the same as the variation transmitted from the gyro sensor 30.

The optical image stabilization unit 12B may physically move the lens assembly 10 (refer to FIG. 1) or the image sensor 20 in response to the first compensation value to output a first control signal OC for adjusting the path of an optical signal. The electronic image stabilization unit 22B may output a second control signal EC for adjusting the image sensor 20 (refer to FIG. 1) in response to the second compensation value. Referring to the graph, variation included in the variation signal GO output from the gyro sensor 30 may be substantially the same as the sum of a compensation value included in the first control signal OC, which is output from the optical image stabilization unit 12B, and a compensation value included in the second control signal EC, which is output from the electronic image stabilization unit 22B. For example, the optical image stabilization unit 12B may perform image stabilization in response to the first compensation value for performing optical image stabilization (OIS), and may transmit a value, obtained by subtracting the first compensation value from the variation transmitted from the gyro sensor 30, to the electronic image stabilization unit 22B.

The gyro sensor 30, the optical image stabilization unit 12B, and the electronic image stabilization unit 22B may be connected for serial communication. For example, the gyro sensor 30, the optical image stabilization unit 12B, and the electronic image stabilization unit 22B may be connected in an inter-integrated circuit (I2C) communication manner or a two-wire interface (TWI) manner. Referring to FIG. 3, the gyro sensor 30 and the optical image stabilization unit 12B may be connected for 1:1 communication. Here, the gyro sensor 30 may be a slave device Sx, and the optical image stabilization unit 12B may be a master device Mx. Further, the electronic image stabilization unit 22B and the optical image stabilization unit 12B may be connected for 1:1 communication. Here, the electronic image stabilization unit 22B may be a slave device Sx, and the optical image stabilization unit 12B may be a master device Mx.

Figure 4:
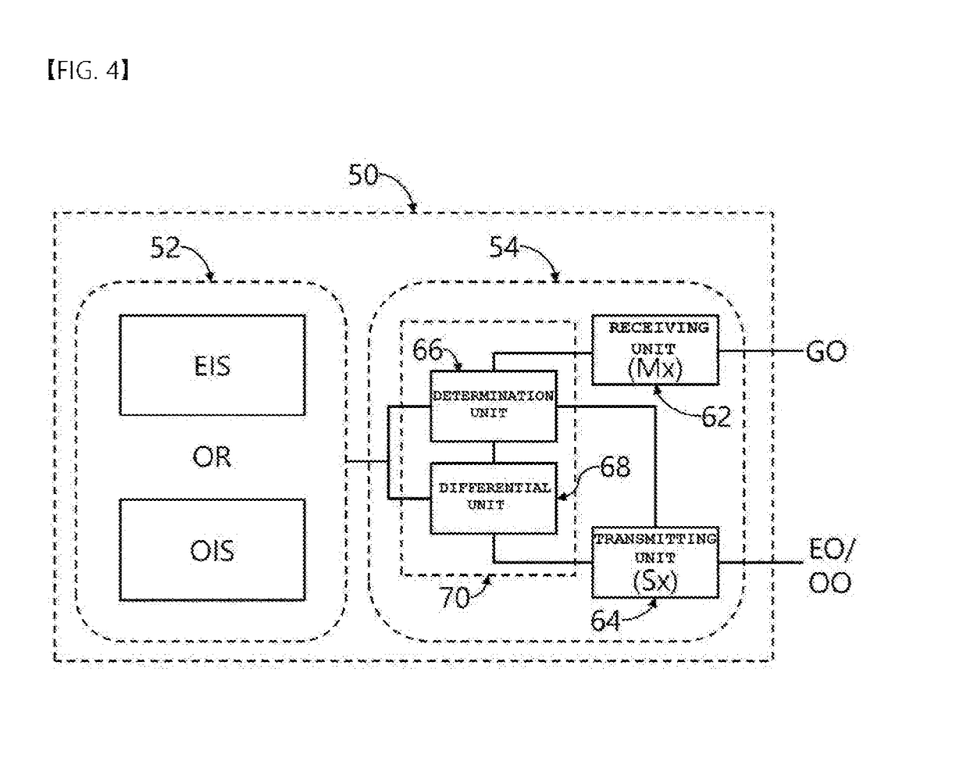
FIG. 4 shows a control device for performing image stabilization (IS).

FIG. 4 shows a control device for performing image stabilization (IS).

As illustrated, the control device 54 for performing image stabilization may be disposed at the input terminal of a circuit unit 52, which performs electronic image stabilization (EIS) or optical image stabilization (OIS), and may be implemented as a single image stabilization device 50.

Specifically, the control device 54 may include a receiving unit 62, which receives a variation signal GO transmitted from the gyro sensor, a determination unit 70, which determines the amount of correction or compensation through the circuit unit 52 in the total movement variation included in the variation signal GO and outputs the remaining amount, and a transmitting unit 64, which transmits an output signal EO/OO including the remaining amount transmitted from the determination unit 70.

The determination unit 70 may include a determination unit 66, which compares the maximum compensation value that is realized by the circuit unit 52 with the movement variation transmitted through the receiving unit 62, and a differential unit 68, which subtracts the compensation value that is realized by the circuit unit 52 from the variation signal GO in accordance with the result of comparison by the determination unit 66.

The configuration of the determination unit 70 and the method of determining the compensation value may vary depending on the embodiment. For example, the determination unit 70 may perform determination based on a compensation value of another image stabilization device, which is connected to the transmitting unit 64, rather than based on the maximum compensation value of the circuit unit 52 connected to the determination unit 70. Alternatively, the determination unit 70 may determine the amount of compensation and the remaining amount based on a determination as to whether it is efficient for the circuit unit 52 to perform correction at a predetermined proportion of the movement variation transmitted from the receiving unit 62 or in accordance with predetermined characteristics. Meanwhile, the amount of compensation may vary depending on whether the circuit unit 52 connected to the determination unit 70 is performing electronic image stabilization (EIS) or optical image stabilization (OIS).

Figure 5:
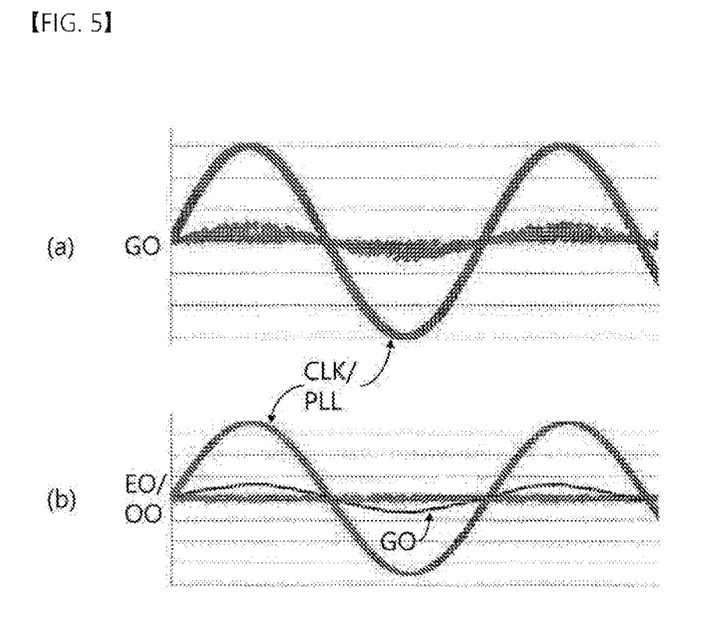
FIG. 5 shows the operation of the control device shown in FIG. 4.

FIG. 5 shows the operation of the control device 54 (refer to FIG. 4) described with reference to FIG. 4. Specifically, (a) may show the operation of the receiving unit 62 (refer to FIG. 4) of the control device, and (b) may show the operation of the transmitting unit 64 (refer to FIG. 4) of the control device.

(a) shows a variation signal GO transmitted from the gyro sensor and input to the receiving unit 62, and (b) shows an output signal EO/OO output from the transmitting unit 64. The variation signal GO and the output signal EO/OO are transmitted in response to a regular reference signal CLK/PLL. Here, the output signal EO/OO, the intensity of which is lower than that of the variation signal GO, is transmitted. This explains that the control device outputs a remaining amount, which is obtained by excluding a portion of the movement variation included in the variation signal GO transmitted through the receiving unit 62, through the transmitting unit 64.

Figure 6:
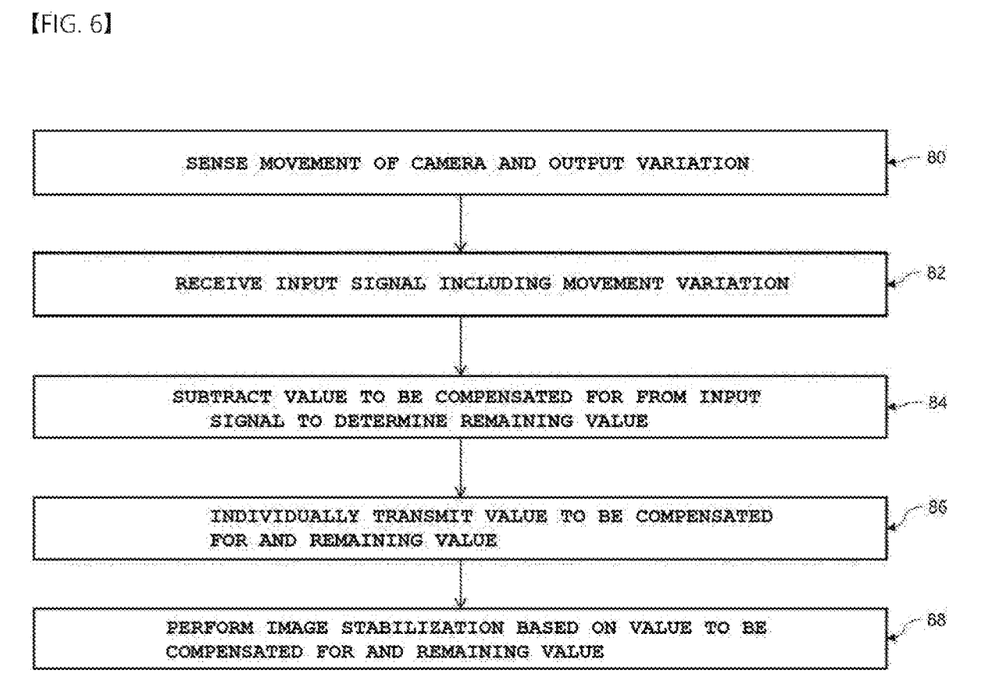
FIG. 6 shows a method of correcting the movement of a camera.

FIG. 6 shows a method of correcting the movement of a camera.

As illustrated, the method of correcting the movement of a camera may include a step 80 of sensing the movement of the camera and outputting variation, a step 82 of receiving an input signal including a movement variation, a step 84 of subtracting a value to be compensated for from the input signal to determine a remaining value, a step 86 of individually transmitting the value to be compensated for and the remaining value, and a step 88 of performing image stabilization based on the value to be compensated for and the remaining value.

The movement of the camera may be sensed through a gyro sensor, which is included in the camera or which is configured to interlock with the camera. For example, a portable device may include various sensors, which are provided separately from the camera module, and a gyro sensor may also be included in the portable device. A camera mounted in a portable device may not include a gyro sensor, but may receive information about the movement of the portable device from a sensor included in the portable device.

When the variation in the movement of the camera or the portable device equipped with the camera is transmitted (82), it is necessary to determine the value to be compensated for and the remaining value by dividing the variation in order to perform different types of image stabilization (i.e. electronic image stabilization (EIS) and optical image stabilization (OIS)) (84).

Depending on the embodiment, the process of determining a value to be compensated for and a remaining value may vary. For example, the process may vary depending on which one of the different types of image stabilization methods is preferentially used to determine a value to be compensated for, or may vary depending on which one the different types of image stabilization methods is more efficient based on the characteristic of a movement variation transmitted through a gyro sensor. Further, if the different types of image stabilization methods have a limited compensation range, a value to be compensated for and a remaining value may be determined based on the limited range.

When the value to be compensated for and the remaining value are determined, the values may be transmitted to image stabilization circuits performing different types of image stabilization (86), and the image stabilization circuits may respectively perform electronic image stabilization (EIS) and optical image stabilization (OIS) based on the value to be compensated for and the remaining value (88).

Figure 7:
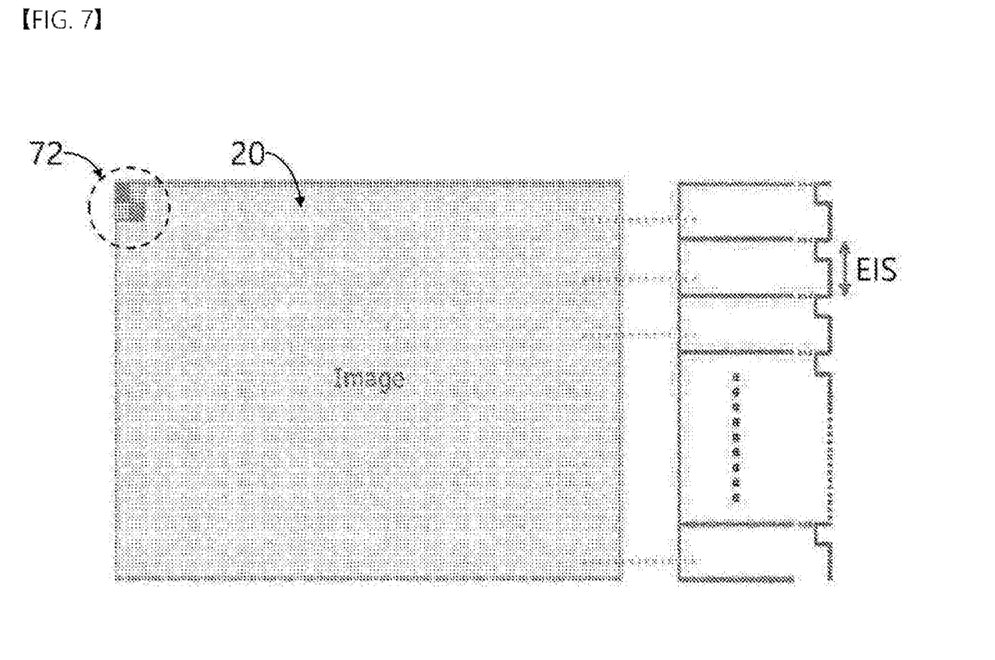
FIG. 7 shows electronic image stabilization (EIS).

FIG. 7 shows electronic image stabilization (EIS).

As illustrated, the image sensor 20 may include a plurality of pixels 72. Each pixel 72 is implemented as a sensor capable of sensing different colors (e.g. R, G, G, and B).

Electronic image stabilization (EIS) may be implemented in various ways. For example, the area of the image sensor 20 may be adjusted in response to a control signal EC (refer to FIGS. 2 and 3) output from the electronic image stabilization unit 22A and 22B (refer to FIGS. 2 and 3). The effective area of the image sensor 20, which converts an optical signal into an electrical signal in rows and columns, may be adjusted (EIS) in response to the control signal EC. Electronic image stabilization (EIS) may be relatively easily controlled. However, the size of a camera or an image sensor, which is mounted in a portable device, may be limited due to space limitation. For this reason, the compensation range of electronic image stabilization (EIS) may be limited.

Figure 8:
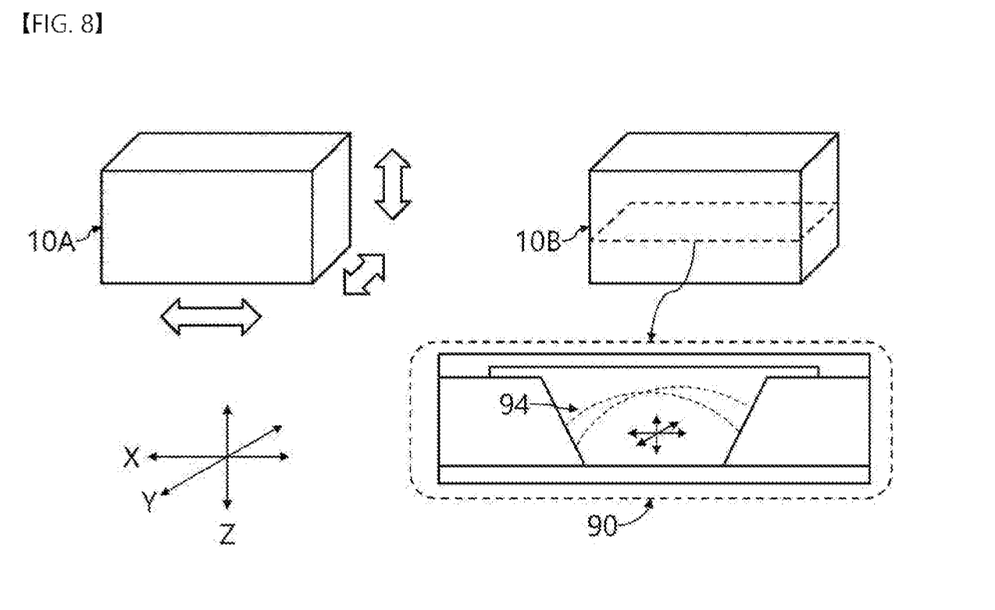
FIG. 8 shows optical image stabilization (OIS).

FIG. 8 shows optical image stabilization (OIS).

As illustrated, optical image stabilization (OIS) may be performed by physically moving a lens assembly 10A to change the path of an optical signal. Variation in the movement of a camera or a portable device equipped with a camera, which is output from the gyro sensor 30 (refer to FIG. 1), may be transmitted in the form of acceleration based on the X, Y and Z axes. The optical image stabilization unit 12A and 12B (refer to FIGS. 2 and 3) may output a control signal OC in response to the variation in movement. The lens assembly 10A may move in an upward-and-downward direction, a leftward-and-rightward direction, or a forward-and-backward direction in response to the control signal OC.

Meanwhile, a lens assembly 10B may include a liquid lens 90, the focal length of which is changed by electrical energy. The liquid lens 90 may be adjusted in focal length in accordance with a change in an interface 94 formed between two kinds of liquid having respectively different properties. Here, the change in the interface 94 may be adjusted by voltage applied to the lens 90.

The liquid lens 90 using an electrowetting phenomenon may reduce the size of a camera module compared to a configuration in which the position of a focal point is adjusted by moving a lens (adjusting the distance between lenses), and may consume a small amount of power compared to a configuration in which a lens is mechanically moved by a motor or the like.

The lens assembly 10B including the liquid lens 90 may realize optical image stabilization (OIS) by adjusting the interface 94 of the liquid lens 90 included in the lens assembly 10B without the necessity to move the lens assembly 10B in an upward-and-downward direction, a leftward-and-rightward direction, or a forward-and-backward direction.

An optical device (or an optical instrument) including the camera module described above may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the liquid lens. In addition, the optical device may be implemented in a portable device such as, for example, a smart phone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and the essential characteristics of the disclosure set forth herein. Accordingly, the above detailed description is not intended to be construed to limit the disclosure in all aspects and to be considered by way of example. The scope of the disclosure should be determined by reasonable interpretation of the accompanying claims and all equivalent modifications made without departing from the disclosure should be included in the following claims.

The invention claimed is:

1. A camera module, comprising:
   a lens assembly comprising a plurality of lenses;
   an image sensor converting an optical signal transmitted through the lens assembly into an electrical signal;
   a gyro sensor outputting a variation signal in response to movement of the lens assembly and the image sensor; and a processor configured to:
  determine a first compensation value used to perform optical image stabilization (OIS) by driving at least one lens of the plurality of lenses;
  determine a second compensation value used to perform electronic image stabilization (EIS) by adjusting an effective area of the image sensor in response to the variation signal; and
  output a first control signal and a second control signal to perform image stabilization in response to the first compensation value and the second compensation value,
  wherein the processor is configured to determine the first compensation value by subtracting the second compensation value used to perform the electronic image stabilization from the variation signal.

2. The camera module according to claim 1, wherein the processor is configured to:
  output the first control signal to drive the at least one lens of the plurality of lenses in response to the first compensation value; and
  output the second control signal to adjust the image sensor in response to the second compensation value.

3. The camera module according to claim 1, wherein, when the variation signal is less than a maximum value of the second compensation value used to perform the electronic image stabilization, the processor is further configured to determine that there is no first compensation value.

4. The camera module according to claim 2, wherein the processor is configured to:
  perform the optical image stabilization (QIS) by outputting the first control signal to move the at least one lens of the plurality of lenses in an optical-axis direction or in a direction perpendicular to an optical axis, and
  output the second control signal to adjust the effective area of the image sensor that converts the optical signal into the electrical signal.

5. The camera module according to claim 2, wherein the lens assembly comprises at least one liquid lens, the at least one liquid lens comprising a conductive liquid and a non-conductive liquid, the conductive liquid and the non-conductive liquid forming an interface therebetween,
  wherein the processor is configured to perform the optical image stabilization (OIS) by outputting the first control signal to adjust the interface of the liquid lens, and
  wherein the processor is configured to output the second control signal to adjust the effective area of the image sensor that converts the optical signal into the electrical signal.

6. A method of correcting movement of a camera, the method comprising:
  sensing the movement of the camera and outputting variation;
  performing first image stabilization in response to a first compensation value calculated from the variation; and
  performing second image stabilization in response to a second compensation value calculated by subtracting the first compensation value from the variation,
  wherein the first image stabilization comprises electronic image stabilization (EIS), and the second image stabilization comprises optical image stabilization (OIS).

7. The method according to claim 6, wherein the performing the first image stabilization in response to the first compensation value calculated from the variation comprises:
  receiving an input signal comprising the variation;
  determining the second compensation value by subtracting the first compensation value from the input signal;
  outputting the second compensation value; and
  performing the first image stabilization in response to the first compensation value.

8. The method according to claim 7, wherein the performing of the first image stabilization in response to the first compensation value calculated from the variation comprises determining the first compensation value by comparing the input signal with a maximum compensation value of a stabilization unit which performs image stabilization including the optical image stabilization (OIS) and the electronic image stabilization (EIS).

* * * * *